US009571383B2

United States Patent
Rácz et al.

(10) Patent No.: US 9,571,383 B2
(45) Date of Patent: Feb. 14, 2017

(54) REROUTING TECHNIQUE

(75) Inventors: Sándor Rácz, Cegléd (HU); Jonas Edstam, Mölndal (SE); Balázs Peter Gerö, Budapest (HU); János Harmatos, Budapest (HU); Karl-Magnus Möller, Göteborg (SE); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 136 days.

(21) Appl. No.: 14/357,853

(22) PCT Filed: Sep. 13, 2012

(86) PCT No.: PCT/EP2012/003842
§ 371 (c)(1),
(2), (4) Date: Jul. 25, 2014

(87) PCT Pub. No.: WO2013/071989
PCT Pub. Date: May 23, 2013

(65) Prior Publication Data
US 2014/0341037 A1    Nov. 20, 2014

Related U.S. Application Data
(60) Provisional application No. 61/560,551, filed on Nov. 16, 2011.

(51) Int. Cl.
*H04L 12/707*  (2013.01)
*H04L 12/801*  (2013.01)
(Continued)

(52) U.S. Cl.
CPC .............. *H04L 45/22* (2013.01); *H04L 47/12* (2013.01); *H04L 47/122* (2013.01);
(Continued)

(58) Field of Classification Search
CPC ........ H04L 45/22; H04L 47/12; H04L 47/122; H04L 47/14; H04L 47/125; H04W 28/0268; H04W 28/048; H04W 40/12; H04W 76/041
(Continued)

(56) References Cited

U.S. PATENT DOCUMENTS

2008/0281987 A1\* 11/2008 Skalecki ............. H04L 12/4658
709/253
2008/0291928 A1\* 11/2008 Tadimeti ................. H04L 45/00
370/401
(Continued)

FOREIGN PATENT DOCUMENTS

CA  2771818 A1  3/2011
CN  1968156 A   5/2007
(Continued)

OTHER PUBLICATIONS

Almes, G. et al., "A One-way Packet Loss Metric for IPPM." The Internet Society. Network Working Group. Request for Comments 2680. Advanced Network & Services. Sep. 1999. 1-16.
(Continued)

*Primary Examiner* — Andrew Chriss
*Assistant Examiner* — Ellen Kirillova
(74) *Attorney, Agent, or Firm* — Murphy, Bilak & Homiller, PLLC

(57) ABSTRACT

A technique for routing data frames in a telecommunications backhaul network (100) is provided. The telecommunication backhaul network (100) includes a plurality of points and links between the points so that at least two different routes for communicating data frames between a pair of end points is provided. A first end point (102) routes data frames that belong to a communication tunnel between the first end point and second end point (104) on a first route (106),
(Continued)

which includes one or more intermediate points (100). At least some of the data frames include a continuity check message. The first end point reroutes data frames belonging to the communication tunnel to a second route that is different from the first route (106), if certain data frames including the continuity check message are lost in the network (100). As to a method aspect of the technique, at least one of the links of the first route are switched to a reduced link capacity. At least a portion of the data frames including the continuity check message are dropped in response to the reduction in link capacity by at least one of the intermediate points (110) of the first route (106).

15 Claims, 6 Drawing Sheets

(51) Int. Cl.
*H04L 12/803* (2013.01)
*H04W 28/02* (2009.01)
*H04W 28/04* (2009.01)
*H04W 40/12* (2009.01)
*H04W 76/04* (2009.01)

(52) U.S. Cl.
CPC ............ *H04L 47/125* (2013.01); *H04L 47/14* (2013.01); *H04W 28/0268* (2013.01); *H04W 28/048* (2013.01); *H04W 40/12* (2013.01); *H04W 76/041* (2013.01)

(58) Field of Classification Search
USPC .......................................... 370/235
See application file for complete search history.

(56) References Cited

U.S. PATENT DOCUMENTS

| | | | | |
|---|---|---|---|---|
| 2010/0039935 | A1* | 2/2010 | Davison | H04L 12/4633 370/228 |
| 2012/0014261 | A1* | 1/2012 | Salam | H04L 43/0811 370/242 |
| 2013/0109299 | A1* | 5/2013 | Roos | H04B 7/18528 455/12.1 |

FOREIGN PATENT DOCUMENTS

| | | |
|---|---|---|
| CN | 101252494 A | 8/2008 |
| CN | 101645797 A | 2/2010 |
| CN | 101919207 A | 12/2010 |
| JP | 4757770 B2 | 8/2011 |

OTHER PUBLICATIONS

Busi, I. et al., "MPLS-TP OAM based on Y.1731." Internet Engineering Task Force. MPLS Working Group. Jul. 11, 2011. 1-29.
Vigoureux, M. et al., "Requirements for Operations, Administration, and Maintenance (OAM) in MPLS Transport Networks." Internet Engineering Task Force. Request for Comments 5860. May 2010. 1-18.
IEEE, "IEEE Standard for Local and metropolitan area networks—Virtual Bridged Local Area Networks Amendment 5: Connectivity Fault Management", IEEE Computer Society Std 802.1ag, Dec. 17, 2007, 1-260.
Unknown, Author, "OAM functions and mechanisms for Ethernet based networks", Telecommunication Standardization Sector of International Telecommunication Union, Y.1731, May 2006, 1-80.

* cited by examiner

REROUTING TECHNIQUE

TECHNICAL FIELD

The present disclosure generally relates to the field of data networks, such as stationary or mobile telecommunications networks as well as combinations thereof. More specifically and without limitation, the disclosure relates to a technique for routing data frames in such a network.

BACKGROUND

For a network component accessing an end point of a network or subnetwork, availability and capacity of a network connection to another end point in the network are important characteristics of the network connection, independent of a physical routing path used in the network for providing the network connection. Availability refers to the degree to which the network connection is in a specified state of operation, such as the existence of network connectivity with a specified capacity. Capacity refers to the bit rate provided by the network connection. Adaptive Modulation (AM), for example in a link using microwave equipment, is an efficient tool to increase the link capacity. However, the availability of the increased link capacity is often reduced.

For example, a microwave link is planned for a small Bit Error Rate (BER) at a low modulation level during major part of its operation time, resulting in approximately 99.999% availability of the link. Adaptive modulation means that in good radio conditions, the microwave channel is able to provide significantly higher capacity with lower availability of approximately 99.995% to 99.9% by using increased modulation levels. The used modulation level thus depends on current radio channel conditions. Automatic switching between the modulation levels provides the highest available link capacity for the current radio channel conditions.

The advantage of adaptive modulation can be utilized efficiently in networks carrying both services with "strict guarantees", which services typically need moderate but guaranteed bandwidth with high availability, and "best effort" services, which can utilize significantly higher link capacity but can tolerate service degradation. Examples for services with strict guarantees include services with Guaranteed Bit Rate (GBR), voice services and video call services. The availability required by services with strict guarantees can be 99.999%. Data communication services are often best effort services.

If a double-connected network is deployed, e.g., using microwave links, it is possible to protect the services carried by the lowest modulation level when the link capacity is going down to zero by using a protection switching mechanism. The protected traffic is rerouted to an alternative path, which does not contain the failed link. Herein, "failed" and "fault" refer to the outage of network connectivity.

Typical services, for example in the context of telecommunication, can tolerate only a very short time of outage and/or capacity degradation. Consequently, a restoration time is limited, for example to 50 ms. Achieving the short restoration time implies an even more rapid fault detection.

Conventional techniques for achieving the short restoration time use the fault detection mechanism described in the Recommendation ITU-T Y.1731 ("OAM Functions and Mechanisms for Ethernet based Networks") of the International Telecommunication Union as published in July 2011 and the standard document IEEE 802.1ag ("IEEE Standard for Local and Metropolitan Area Networks") for Connectivity Fault Management (CFM) as part of the Ethernet OAM Architecture for Operations, Administration and Maintenance (OAM).

To detect a fault between Maintenance End Points (MEPs), continuity check messages are periodically exchanged between them, which messages are referred to as Continuity Check Messages (CCMs) in the Recommendation ITU-T G.8031/Y.1342 or Continuity Check (CC) messages in networks using Multiprotocol Label Switching (MPLS). The fault is indicated to the MEP by the loss of one or more continuity check messages.

Conventional techniques using continuity check messages, including the Ethernet OAM mechanism and the MPLS mechanism, can only handle the case when the capacity of a link, e.g., a microwave link, is going down to zero. A microwave link capacity degradation, which can violate a guaranteed bit rate or a minimum bit rate of a service, is not detected. For example, the volume of GBR services can be higher than the capacity provided by the lowest modulation level of adaptive modulation. In this case, the service is degraded or collapses, when the adaptive modulation switches to a certain modulation level, since the required bandwidth is not available anymore. However, the fault-handling mechanism is not activated, because the link capacity is not zero and the continuity check messages are not lost.

In the context of the Ethernet OAM mechanism, it has been proposed to additionally use the number of dropped CCMs as an indicator of a degree of degradation. The number of lost CCMs, however, depends on other parameters, such as the number of links between the MEPs and a priority level of the CCMs. Thus, the number of lost CCMs is an unreliable indicator for capacity degradation.

A further solution proposed in the context of the Ethernet OAM mechanism extends the standard Ethernet OAM architecture by using a notification message in addition to the CCMs. However, sending and processing the notification message requires amendments beyond the standard architecture at multiple places throughout the network and causes additional signaling through the network. Furthermore, due to the additional time for transmitting and interpreting the notification message, the restoration time does not meet certain Quality of Service (QoS) requirements.

SUMMARY

Accordingly, there is a need to provide a technique that allows, at least in some situations, rerouting services affected by capacity degradation.

According to one aspect, a method of routing data frames in a network including Maintenance End Points and Maintenance Intermediate Points is provided. The Maintenance Intermediate Point informs the Maintenance End Points of a degraded microwave link by explicitly dropping continuity check message frames belonging to one or more impacted tunnels, or by dropping all frames carried by one or more impacted tunnels.

According to another aspect, a method of routing data frames in a telecommunications backhaul network is provided. The telecommunications backhaul network includes a plurality of points and links between the points providing at least two different routes for communicating data frames between a first end point and a second end point. The end points are configured to route data frames belonging to a communication tunnel between the first end point and the second end point on a first route including one or more intermediate points, at least some of the data frames including a continuity check message, and to reroute data frames belonging to the communication tunnel to a second route different from the first route if certain data frames including the continuity check message are lost in the network. The method comprises the steps of switching at least one of the links of the first route to a reduced capacity; and dropping at least a portion of the data frames including the continuity check message in response to the reduction in link capacity by at least one of the intermediate points of the first route.

In at least some embodiments, the end points are thus notified in order to activate a protection switching for those services, which are impacted by the reduced capacity of the at least one of the links. Implementing the method can require changes only in one or all of the intermediate points, otherwise using the standardized Ethernet Operations, Administration and Maintenance (OAM) concept. At least for some implementations, there is no impact on the end points.

At least some embodiments allow communicating the reduction in link capacity from the intermediate point to one or all end points by means of the absence of continuity check messages, without requests or additional signaling between the intermediate point and the end point. A delay, e.g., due to additional signaling, in the rerouting of the communication tunnel from the first route to the second route can thus be avoided. In at least some implementations, dropping data frames including the continuity check message by one of the intermediate points can trigger one of the end points to reroute the communication tunnel without implementing additional functionality or changes at the end point.

Same or some other embodiments can rapidly reroute the communication tunnel in case of link degradation. The rerouting can be performed prior to a link failure. The rerouting can be performed by an end point independent of a physical or topological distance to the switched (e.g., degraded) link or to the intermediate point adjacent to the switched link.

The configuration of the end points for routing and rerouting encompasses the case of one end point being configured to transmit data frames to a route and/or another end point being configured to receive data frames from the route.

The switching to the reduced link capacity may be performed and/or controlled by an intermediate point adjacent to the switched link. Alternatively or in combination, the switching may be detected by an intermediate point adjacent to the switched link. In a further alternative or combination, the switching may be signaled to an intermediate point adjacent to the switched link.

One or more of the links, for example the switched link, may include a microwave link. The reduction in link capacity may be due to a change of a modulation applied for the switched link. The switching may be a switching of a modulation level.

At least one of the end points may be a branching point of the routing. The first and second end points may be the only points that the first and second routes have in common. The end points may include Maintenance End Points (MEPs) according to IEEE 802.1ag. The end points may define a Maintenance Association (MA). The MA may be defined by the first end point and the second end point independent of the different routes. The one or more intermediate points may include Maintenance Intermediate Points (MIPs) according to IEEE 802.1ag.

The continuity check message may be a Continuity Check Message (CCM) for Ethernet Linear Protection Switching according to the Recommendation ITU-T G.8031/Y.1342. Alternatively or in addition, the continuity check message may be a Continuity Check (CC) message for Multiprotocol Label Switching (MPLS), for example as defined by the Internet Engineering Task Force (IETF) for open standardization.

The communication tunnel may be identified by means of a label of the data frame. Details on MPLS label stack encoding are included, inter alia, in the document RFC 3032 published in January 2001 and the document RFC 5586 published in June 2009. An exemplary implementation of OAM in MPLS transport networks is defined in the document RFC 5860 published in May 2010, which describes exemplary Continuity Checks in subsection 2.2 (particularly, in clause 2.2.2) thereof. A Label Switched Path (LSP) may be an example of the first route and/or the second route. The Continuity Check may monitor the LSP for any continuity defects.

Any standards-compliant messages, e.g., the CCMs and/or the CC messages, may be used as the continuity check messages of the technique disclosed herein. Examples of the continuity check messages as used in the Continuity Check according to the Bidirectional Forward Detection (BFD) protocol are described in section 3 of the document RFC 6428. The continuity check message may be an MPLS-TP CC message according to clause 3.4 of RFC 6428. Alternatively or in combination, the continuity check message may be a Continuity Check Protocol Data Unit (CC-PDU).

The continuity check message may be communicated by transmitting a data frame from the first end point to the second end point, from the second end point to the first end point, or both. The data frames including the continuity check messages may be periodically transmitted, e.g., by at least one of the end points. The end point expecting the reception of a continuity check message does not have to distinguish between absence due to the dropping of continuity check messages and other causes for the loss of continuity check messages.

Dropping at least a portion of a data frame including the continuity check message may include deleting and/or not forwarding the data frame. Dropping at least a portion of the data frame including the continuity check message may include dropping the entire data frame including the continuity check message or deleting the continuity check message from the data frame. The data frame may be a Medium Access Control (MAC) frame according to IEEE 802.3. Some implementations may drop only data frames of a communication tunnel that is affected or impacted by the reduction in link capacity.

Data frames belonging to two or more different communication tunnels may be communicated between the first end point and the second end point. Each of the data frames may include an identifier of the communication tunnel. The communication tunnels may be at least one of defined, identified, routed and rerouted by means of a Virtual Local Area Network (VLAN). Each of the data frames may include a VLAN tag that identifies the communication tunnel. Alternatively or in addition, a label according to the MPLS Transport Protocol (MPLS-TP) may be used for at least one of defining, identifying, routing and rerouting the communication tunnel. In the case of an MPLS network, some or each of the end points may include a Label Edge Router (LER) or a Label Switching Router (LSR). As a further alternative or in addition, the MA may be used for at least one of defining, identifying, routing and rerouting the communication tunnel. The communication tunnel may be identified by an MA Identifier (MAID).

A lower limit for the link capacity may be determined. Determining the lower limit may be triggered by the reduction in link capacity. The lower limit may be associated to the communication tunnel. The at least one of the intermediate points may determine the lower limit. For each of the communication tunnels, the at least one of the intermediate points may determine a lower limit for the link capacity.

Lower limits for the communication tunnels may be stored in a table. Accessing the table by the at least one intermediate point may be triggered by the reduction in link capacity. Each of the intermediate points may store such a table. Alternatively, the table may be shared for access by all intermediate points along the first route.

A reduction in link capacity below the lower limit may trigger the dropping of at least those data frames belonging to the corresponding one of the communication tunnels and including the continuity check message. The reduction in link capacity below the lower limit may trigger the dropping of all data frames belonging to the corresponding one of the communication tunnels. The lower limit may be larger than zero. The lower limit set to a link capacity larger than zero may indicate that the corresponding communication tunnel is to be rerouted in case of link degradation. The lower limit may be zero. The lower limit set to zero may indicate that the corresponding communication tunnel is to be rerouted in case of link failure.

The link capacity may be determined by a transmission rate that is, currently or after the switching, available to the at least one intermediate point. Alternatively or in combination, the link capacity may be determined by a transmission rate that is, currently or after the switching, provided by the at least one link. The link capacity may be determined based on a Signal-to-Noise Ratio (SNR) of the link and/or the modulation applied for the link. The link may be controlled by the at least one of the intermediate points. The at least one link may be adjacent to the at least one of the intermediate points.

The method may further comprise the step of rerouting data frames belonging to the communication tunnel between the first end point and the second end point to the second route different from the first route in response to the absence of at least a portion of the data frames including the continuity check message. The absence may be determined at one or both of the end points. The tunnel identifier of the data frames absent at the end point may determine the communication tunnel which is rerouted.

The rerouting of a data frame belonging to the communication tunnel to the second route may be subject to a reception of continuity check messages communicated on the second route between the first end point and the second end point. The reception of the continuity check message may indicate the availability of the second route or that the second route does not include a link failure. The steps of switching and dropping may further be applied to the second route. The loss of certain continuity check messages on the second route may indicate a transmission capacity of the second route.

The routing of data frames on the first route may include transmitting, from the first end point, data frames including user data. Alternatively or in addition, the routing of data frames on the first route may include transmitting, from the second end point, data frames including the continuity check message. The first end point may transmit the user data frames. Data frames including user data may be transmitted from the first end point to the second end point. The second end point may transmit the data frames including the continuity check messages. The data frames including the continuity check messages may be addressed to the first end point. Alternatively or in addition, data frames including the continuity check message may be multicasted. The first end point may receive continuity check messages that have not been dropped. The first end point may determine the absence of the certain continuity check messages.

In a variant, the data frames including user data and the date frames including the continuity check messages may use different communication tunnels, e.g., different VLANs or different labels in an MPLS network. The communication tunnel used for the data frames including the continuity check messages may be associated to the communication tunnel used for the data frames including user data. The communication tunnel to be rerouted may be determined based on the association.

The loss may be determined when no continuity check message has been received at one or both of the end points for a pre-defined period of time. The pre-defined period of time may be equal to or larger than a multiple of the periodicity of the periodically transmitted continuity check messages.

According to still another aspect, a computer program product is provided. The computer program product comprises code portions for performing one or more of the steps of the method described herein when the computer program product is executed on one or more computing devices. The computer program product may be stored on a computer-readable recording medium such as a permanent or rewritable memory. The computer program product may also be provided for download in one or more computer networks, such as the Internet, a cellular telecommunications network or a wireless or wired Local Area Network (LAN).

As for a hardware aspect, a device for routing data frames in a telecommunications backhaul network is provided. The telecommunications backhaul network includes a plurality of points and links between the points providing at least two different routes for communicating data frames between a first end point and a second end point. The end points are configured to route data frames belonging to a communication tunnel between the first end point and the second end point on a first route including one or more intermediate points, at least some of the data frames including a continuity check message, and to reroute data frames belonging to the communication tunnel to a second route different from the first route if certain data frames including the continuity check message are lost in the network. The device comprises a switching unit adapted to switch at least one of the links of the first route to a reduced link capacity; and a dropping unit adapted to drop at least a portion of the data frames including the continuity check message in response to the reduction in link capacity by at least one of the intermediate points of the first route.

The dropping unit or the entire device may be located at or included in the at least one of the intermediate points. The above-mentioned units or additional units of the device may further be adapted to perform one or more of the steps mentioned in the context of the method aspect and/or the computer program product.

BRIEF DESCRIPTION OF THE DRAWINGS

In what follows, further details and advantages of the disclosure are described with reference to exemplary embodiments illustrated in the drawings, wherein FIG. 1 schematically illustrates a telecommunications backhaul network including a first route and a second route.

DETAILED DESCRIPTION

In the following, for purposes of explanation and not limitation, specific details are set forth, such as particular sequences of steps, components and configurations, in order to provide a thorough understanding of the present disclosure. It will be apparent to the person skilled in the art that the disclosure may be practiced in other embodiments that depart from these specific details. For example, while the embodiments are described with reference to a telecommunications backhaul network, it will be apparent to the skilled person that the disclosure can also be practiced in the context of any other mobile or stationary computer network, or a combination thereof. Furthermore, while the disclosure is primarily described in the context of Ethernet OAM according to the Recommendation ITU-T Y.1731 and the standard document IEEE 802.1ag using continuity check messages according to the protocol defined in the standard document G.8031/Y.1342 on Ethernet Linear Protection Switching mechanism, the disclosure may also be applied in a network using Multi-Protocol Label Switching (MPLS) mechanism and/or continuity check messages according to the MPLS Transport Protocol (TP).

Moreover, those skilled in the art will appreciate that services, functions, logic components and steps explained herein may be implemented using software functioning in conjunction with a programed microprocessor, or using an Application Specific Integrated Circuit (ASIC), a Digital Signal Process (DSP), or a general purpose computer.

It will also be appreciated that, while the following embodiments are described in the context of methods and devices, the technique may also be embodied in a computer program product as well as in a system comprising a computer processor and a memory coupled to the processor, wherein the memory is encoded with one or more programs configured to execute the services, functions, logic components and steps disclosed herein.

Figure 1:
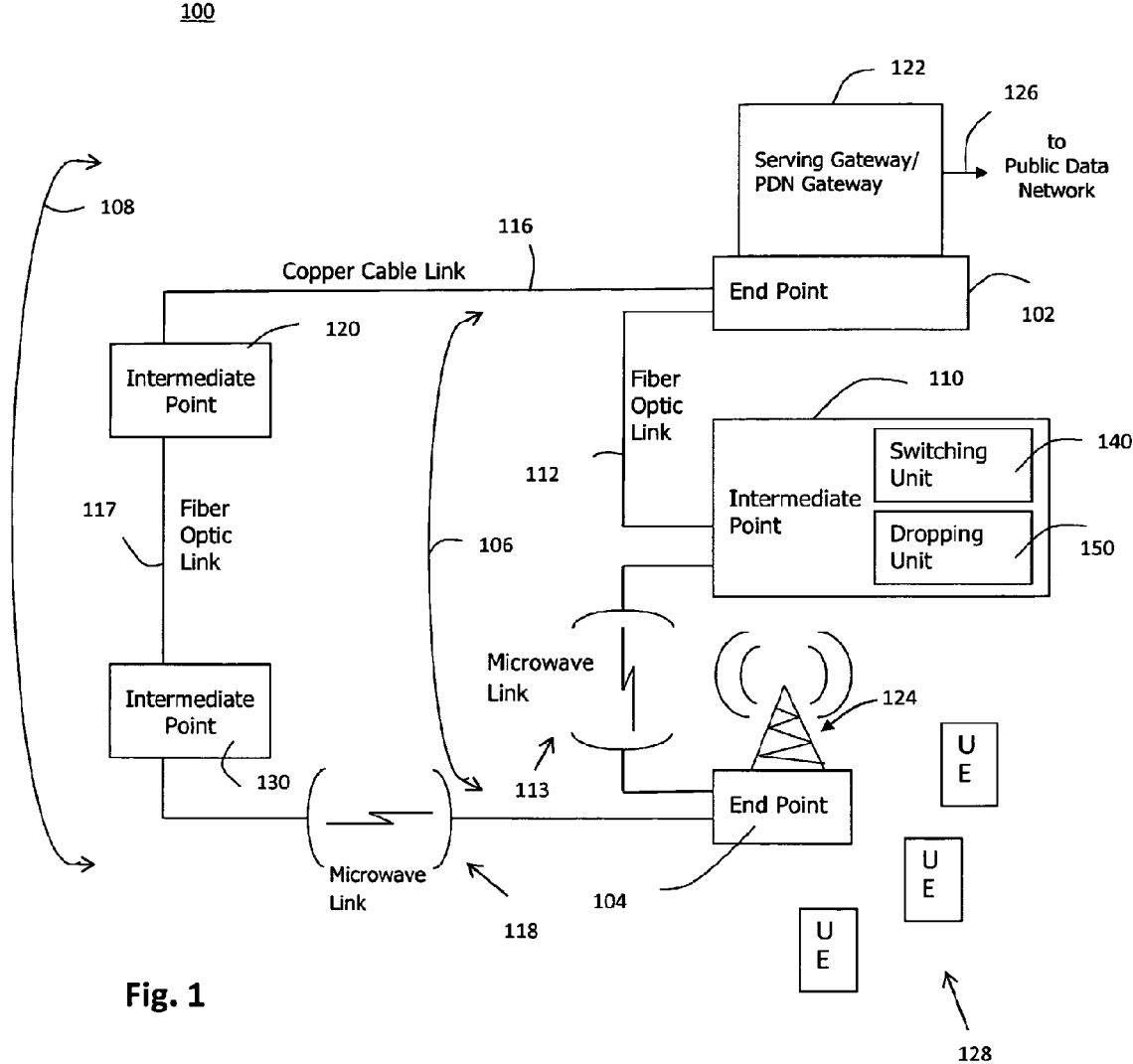

FIG. 1 shows an exemplary telecommunications backhaul network 100 for practicing the technique disclosed herein. The telecommunications backhaul network 100 includes a first end point 102 and a second end point 104. The first and second end points 102, 104 are connected via a first route 106 and a second route 108. The first route 106 includes an intermediate point 110. The first end point 102 is connected to the intermediate point 110 via a fiber-optic link 112. The intermediate point 110 is connected to the second end point 104 via a microwave link 113.

The second route 108 includes intermediate points 120 and 130 as units physically separate from the intermediate point 110 of the first route 106. The functionality provided by each of the intermediate points 120 and 130 may correspond to the functionality of the intermediate point 110.

The first end point 102 is connected to the intermediate point 120 via a copper table link 116. The intermediate point 120 is connected to the intermediate point 130 via a fiber-optic link 117. The intermediate point 130 is connected to the second end point 104 via a microwave link 118.

In general, the first route 106 includes the first end point 102 and the second end point 104 and a plurality of links for connecting at least one intermediate point 110 along the first route 106. The links along the first route 106 may also use the same implementations on a physical layer or different implementations such as the fiberoptic link 112 and the microwave link 113 shown in FIG. 1.

Similarly, the second route 108 includes the same first and second end points 102 and 104 and intermediate points 120 and 130 different from the at least one intermediate point 110 of the first route 106. The points along the second route are connected by a plurality of links 116, 117, 118 that can also use the same implementation on the physical layer or implementations that deviate from those indicated in FIG. 1.

In the use case shown in FIG. 1, the first end point 102 includes a serving gateway 122. The second end point 104 includes a base station 124. The serving gateway 122 provides a connection 126 to a Public Data Network (PDN). The base station 124 is in wireless connection to a plurality of User Equipments (UEs) 128. The telecommunications backhaul network 100 thus provides two physically separate routes 106 and 108 for data and/or voice services provided to the User Equipments 128 via the public data network.

The telecommunications backhaul network 100 allows establishing a plurality of communication tunnels between the first and second end points 102 and 104. Each of the communication tunnels is associated to a service. Such services include Guaranteed Bit Rate (GBR) voice services, Circuit Emulation Services (CES), highly available Committed Information Rate (CIR) services, and minimum rate streaming video services.

The GBR voice service has limited tolerance to loss, delay and jitter. Users tolerate only very short time of outage. This means that the service restoration should be completed within 50 ms to avoid termination of the voice session by the user.

The CES does not tolerate if bandwidth is not sufficient. In case of insufficient band-width, the CES will collapse. Furthermore, since the CES typically carries voice traffic, the voice requirements, e.g., as to switching delay, should be fulfilled in case of rerouting.

The CIR service applies to use cases, when the Radio Access Network (RAN) and the mobile telecommunications backhaul network 100 are owned and/or operated by different operators. The RAN operator leases a fixed capacity transport pipe from the operator of the telecommunications backhaul network 100. A typical scenario for this use case includes that the RAN operator uses hierarchical scheduling at the edge (e.g., one of the end points) to manage its resource sharing control. If the pipe capacity becomes smaller due to Amplitude Modulation (AM) than the value defined in the Service Level Agreement (SLA), the resource sharing control mechanism of the RAN operator will not work properly anymore.

In the case of the minimum rate streaming video service, a minimum rate for video streams should be guaranteed for user satisfaction. Otherwise, the users will terminate the service.

The microwave links 113 and 118 are planned for a small Bit Error Rate (BER) at 114 Mbit/s resulting in an availability of 99.999%. The high availability is achieved using Quadrature Amplitude Modulation with four constellation points (4 QAM). The bit rate of 114 Mbit/s, achieved by 4 QAM, is used for services with strict quality of service guarantees, such as voice and GBR services.

In case of good radio conditions, e.g., a low Signal-to-Noise Ratio (SNR) of the radio channel used by the microwave link 113, the Adaptive Modulation automatically switches to a higher modulation level. Since the higher modulation level provides a higher data rate but is not as often available as the planned basic modulation according to 4 QAM, the increased data rate is associated with lower availability. For example, the next higher modulation level provides 233 Mbit/s at an availability of 99.995%. The next further modulation level provides 352 Mbit/s at an availability of 99.99%. A bit rate of 402 Mbit/s is achieved with 99.95% availability. The highest modulation level according to 256 QAM is used in very good radio conditions and enables the microwave link 113 to provide a bit rate of 455 Mbit/s with 99.9% availability. These higher modulation levels are used for best-effort data services, progressive download, etc. The higher modulation levels are used when no strict service guarantees are needed.

Figure 2:
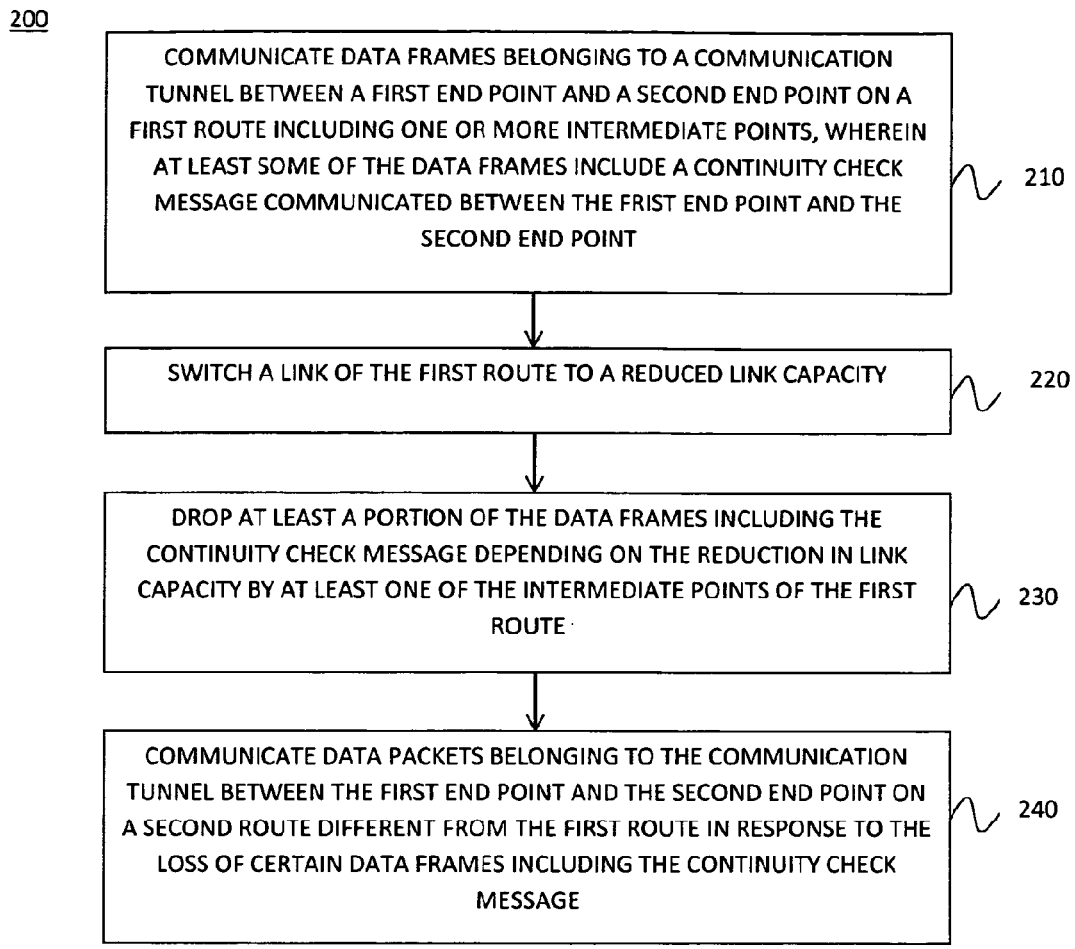
FIG. 2 shows a flowchart of an embodiment of a method of routing data frames in the telecommunications backhaul network of FIG. 1.

FIG. 2 shows a flowchart 200 of a method of routing data frames in a telecommunications backhaul network. The method 200 can be performed in the telecommunications backhaul network 100 shown in FIG. 1. In a step 210 of the method 200, data frames belonging to a communication tunnel are communicated between a first end point and a second end point on a first route including one or more intermediate points. At least some of the data frames include a continuity check message communicated between the first end point and the second end point. The first and second end points can be implemented by the end points 102 and 104 shown in FIG. 1. The first route can be implemented by the route 106 and the at least one intermediate point can be implemented by the intermediate point 110 shown in FIG. 1.

In a step 220 of the method 200, a link of the first route is switched to a reduced link capacity. The reduction in link capacity may be necessary to maintain a pre-defined Bit Error Rate as the Signal-to-Noise Ratio decreases, e.g., due to precipitation between receiving and sending antennas of the microwave link 113.

In a step 230 of the method 200, at least some of the data frames that include the continuity check message are dropped depending on the reduction in link capacity.

All intermediate points along the first route are adapted to perform the step 230. In the exemplary network 100, shown in FIG. 1, the intermediate point 110 includes a dropping unit 150 adapted to perform the step 230.

The step 220 can be implemented as part of the functionality of an intermediate point adjacent to the link which capacity is reduced. In the exemplary network 100 shown in FIG. 1, the intermediate point 110 includes a switching unit 140 adapted to perform the switching of the link capacity of the microwave link 113 according to the step 220.

In a variant of the network 100, the switching unit 140 is not integrated into the intermediate point 110 but located at one of the receiving or sending antennas of the microwave link 113. The switching unit 140 is connected to the dropping unit 150 so that the switching of the modulation level is signaled from the switching unit 140 to the dropping unit 150.

Figure 3:
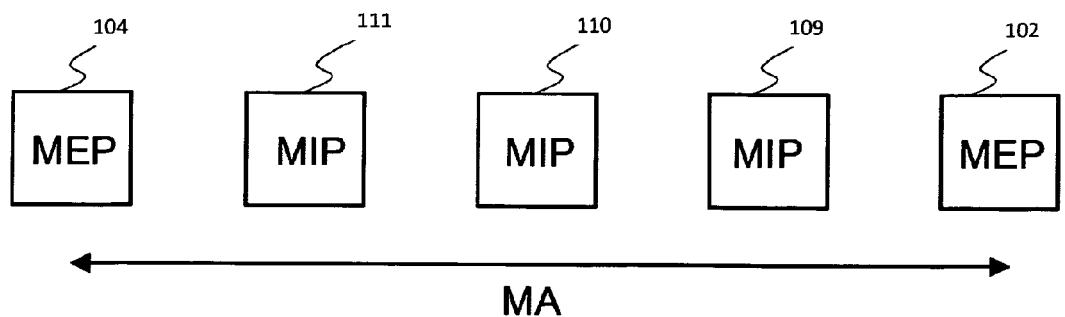
FIG. 3 schematically illustrates a route in the network of FIG. 1 from a logical point of view.

FIG. 3 schematically illustrates the first route 106 in the telecommunications backhaul network 100 as an Ethernet Operations, Administration and Maintenance (OAM) architecture. The first end point 102 and the second end point 104 are referred to as Maintenance End Points (MEP) and the intermediate points 109, 110 and 111 are referred to as Maintenance Intermediate Points (MIP). The network components of the first route 106 form a Maintenance Association (MA) according to the standard IEEE 802.1ag for Connectivity Fault Management (CFM).

Figure 4:
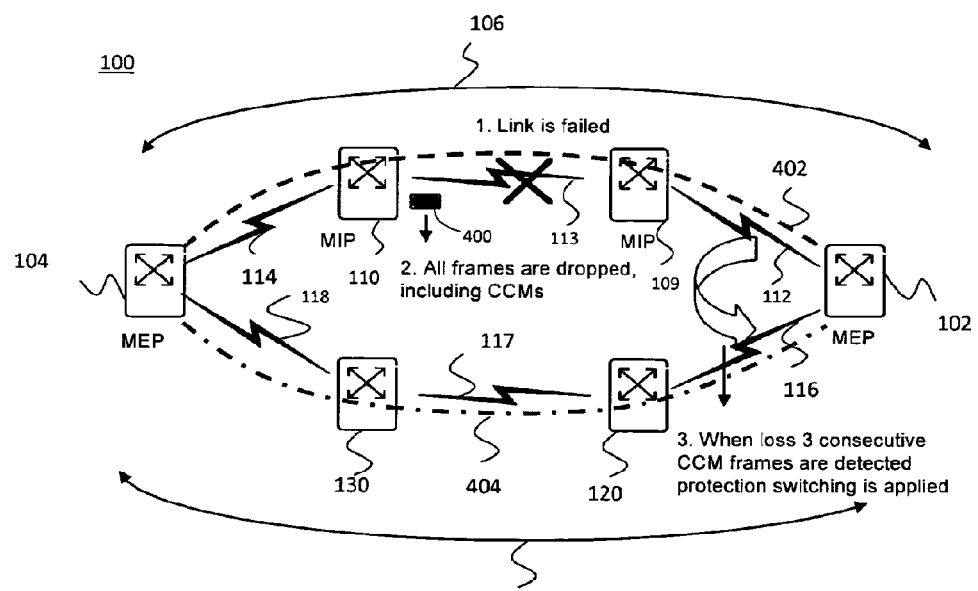
FIG. 4 schematically illustrates the reaction of an end point when certain data frames are lost on the first route.

FIG. 4 schematically illustrates the standardized behavior of the end point 102 or 104 when data frames including a continuity check message are lost. The maintenance association is established between the first end point 102 and the second end point 104 via the intermediate points 109 and 110 of the first route 106. The second route 108 via the intermediate points 120 and 130 is a backup path. The first route 106 includes the links 112, 113 and 114, and the second route 108 includes the links 116, 117 and 118 similar to the links described with reference to FIG. 1 above. Typically, the end points 102 and 104 are the edge nodes of a microwave network or microwave sub-network.

To detect a fault between the end points 102 and 104, periodic messages are exchanged between them, which are generically called continuity check messages. The Continuity Check Messages (CCMs) according to the Recommendation ITU-T G.8031/Y.1342 are an example of the continuity check messages. Any implementation of the Continuity Check (CC) in an MPLS network is also an example of exchanging continuity check messages.

When no continuity check message frame 400 from a peer end point (e.g., the second end point 104) is received within a time interval equal to 3.5 times the continuity check message transmission period (which means that 3 consecutive continuity check frames are lost), then the connection between the two nodes (e.g., the end points 102 and 104) is assumed to be failed and fault-handling processes are activated. The transmission interval of the continuity check message 400 frames can range from 3.3 ms to 10 minutes, so that the frequency of continuity check message frames can be adjusted to any arbitrary restoration time.

In the situation shown in FIG. 4, the link 113 is failed. Consequently, all frames routed along the first route 106 are lost, including the continuity check message frames 400.

A first tunnel, shown with reference sign 402, has a tunnel identifier 1 and is initially routed along the first route 106. A second tunnel 404 has a tunnel identifier 2 and is routed along the second route 108. The fault-handling processes include rerouting the first tunnel 402 from the first route 106 to the second route 108.

The routing and rerouting is defined by means of a Virtual Local Area Network (VLAN). The impacted traffic is rerouted by using another VLAN, which can provide an alternative path, e.g., the second route 108.

In at least some telecommunications use cases and/or above-mentioned services, the service volume can be high enough, so that the lowest modulation level cannot provide the required capacity and/or the required availability. Examples of such tunnels include the following cases.

For a Committed Information Rate (CIR) service requiring high availability and high capacity, the tunnels should also use upper modulation levels. The modulation levels that are used can depend on the CIR service.

Circuit Emulation Service (CES) carrying high speed traffic can have a data volume that is significantly higher than for voice services, since data traffic is carried by the CES. There is no way to distinguish the voice and data services. Therefore, the handling of a CES tunnel should fulfill the voice requirements.

A large volume of streaming video with minimum bit rate can cause that the capacity of the lowest modulation level is not enough to carry the traffic.

In some uses cases, the telecommunications backhaul network 100 is shared among different operators, such as different RAN operators. E.g., different GBR services of different operators may be routed through the same telecommunications backhaul network 100. In this case, the sum of GBR traffic is higher, potentially higher than the capacity of the lowest modulation level.

To sum up, a problem is that the existing Ethernet OAM solution is able to cover only the fault situations when the microwave link capacity is going down to zero, but the capacity reduction caused by Adaptive Modulation and resulting service degradation are not handled.

Alcatel-Lucent has proposed a conventional technique for G.8031for handling the signal degradation by using CCM frames. The essence of the conventional technique is that CCM frames are counted by the MEPs during a pre-defined monitoring period and if a certain number of CCM frames have been lost, signal degradation is detected and protection switching is started.

The above described conventional technique has the following drawbacks and limitations. First, since the detection of signal degradation is based on the loss of CCM frames, the method is able to detect only serious degradation. In case of soft degradation, it may happen that the protected service is already impacted, but the CCM frames are not yet lost, e.g., since the rate of CCM frames is limited. Consequently, the conventional technique cannot guarantee the short restoration time in all cases. Second, the standardized CCM handling in MEPs is altered, since the counting of CCM frames during the monitoring period is needed. Third, the tunnel rerouting of individual services can only be performed by MEPs supporting the alteration of the standard.

Another conventional technique proposed by Huawei extends the Y.1731 standard by using a notification message, which is sent by the degraded microwave link equipment to the edge nodes. The message carries the available link bandwidth. Based on the capacity information, the edge nodes can decide upon rerouting of certain tunnels. This solution can be used for fault notification, but it is also able to carry the actual capacity information, if the link using Adaptive Modulation is degraded.

The proposed conventional technique can handle link degradation due to Adaptive Modulation, but has some problems and drawbacks. First, it requires a centralized architecture. The notification message is used to inform the edge nodes only about the fact of current available bandwidth. The edge nodes need to decide which tunnels should be rerouted. For example, information is needed at the edge nodes about the requirements of the service carried by a certain tunnel. Second, the solution can work on a small-sized, single-edge network and only small service granularity can be supported. In case of a huge number of tunnels and multi-edge topology the decision process becomes very complex. Third, in the case of larger networks, the required time to perform tunnel rerouting can be long, which could raise problems in time-critical services as well as stability problems in case of quick degradation events, e.g., due to multipath fading. Fourth, the proposed conventional technique has an impact on current standards, e.g., because the additional notification message has to be defined for bandwidth notification. The conventional technique also has an impact on edge nodes, e.g., because of a decision process to perform the rerouting of certain tunnels.

Figure 5:
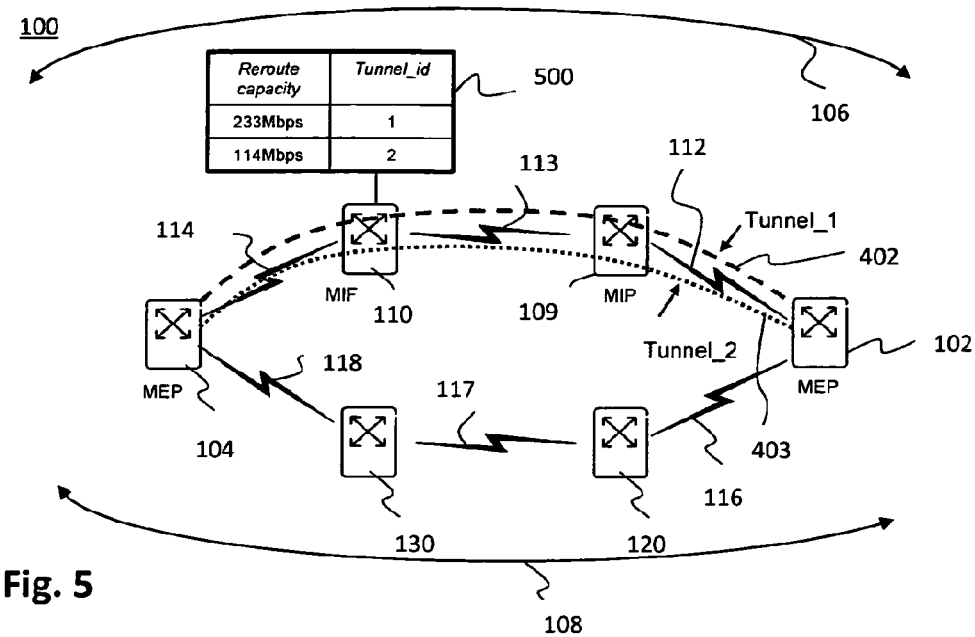
FIG. 5 schematically illustrates a configuration of an intermediate point along the first route.
Figure 6:
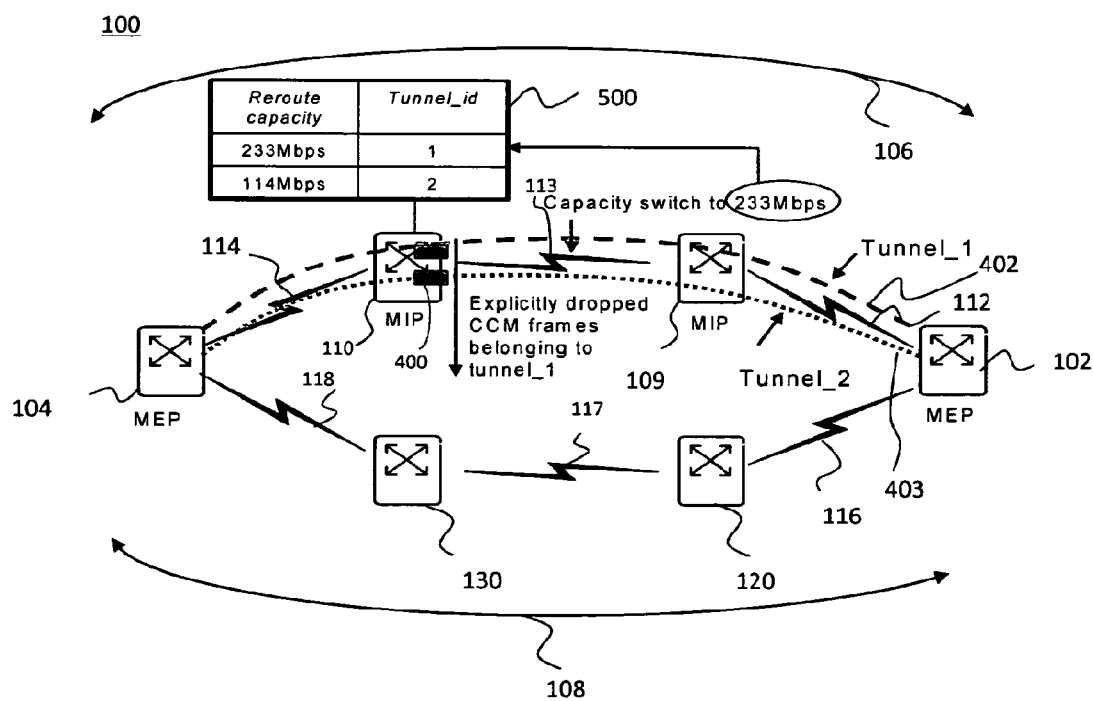
FIG. 6 schematically illustrates the reaction of the intermediate point shown in FIG. 5 when a link is switched to a lower link capacity.

FIGS. 5 and 6 schematically illustrate an embodiment of the technique for routing data frames in a telecommunications backhaul network 100. FIG. 5 also illustrates an exemplary architecture including the network 100 for the technique. The situation shown in FIG. 5 is an initial situation prior to the occurrence of a reduction in the link capacity shown in FIG. 6.

The technique may be considered as an extension to the OMA functionality described above with reference to the FIGS. 3 and 4. While the rerouting functionality of the end point 104 is maintained, the functionality of the intermediate points, such as the intermediate points 109 and 110, is extended by an explicit frame dropping mechanism.

On a data plane level, different services (such as voice service, GBR service, CES, video service, WCDMA best-effort data service, LTE best-effort data service) are carried by different tunnels, such as the tunnels 402 and 403 shown in FIG. 5. The tunnels are identified by a tunnel identifier. The tunnel identifier has the format "tunnel_id", wherein "id" denotes a unique number. In Ethernet networks, the tunnels are identified by using the VLAN tag of the frame.

On a management level, a MA is established between the end points 102 and 104 for each of the tunnels 402 and 403, and identified by a Maintenance Administration Identifier (MAID), which is a globally unique identifier for a set of end points 102 and 104. This provides that the end points 102 and 104 can exactly identify which tunnels should be rerouted if certain continuity check messages are lost in the network.

In all the intermediate points 109 and 110 along the first route 106 functioning as a primary path, a table 500 is maintained. The table contains the association between the tunnels and microwave capacity value at which the tunnel has to be rerouted in order to avoid the degradation of the service carried by the tunnel.

When microwave link capacity is switched to a certain value, then the corresponding intermediate point 110 checks its table 500. If there is an entry (or entries) for the current link capacity, then the following actions are performed.

The continuity check message frames, which are used to monitor the connectivity on the impacted tunnel, are identified. Two examples of tunnel identification are described. In a first example, the continuity check message frames are also carried by the tunnel. In the first example, the "tunnel_id" (e.g., the VLAN tag), the so-called EtherType field in the frame header and the OpCode in the data field of the Ethernet OAM frame identify the continuity check message frame. In a second example, the continuity check message frames use a VLAN different from those of the associated tunnel or tunnels carrying payload. In the second example, the MAID in the OAM frame data field is used to identify the continuity check messages belonging to the impacted tunnel or tunnels.

The continuity check message frames belonging to the impacted tunnel or tunnels are explicitly dropped by the intermediate point 110 adjacent to the microwave link 113, in order to trigger at least one of the end points 102 and 104 to perform the rerouting of the tunnel 402 (i.e., "tunnel_1").

When at least one of the end points 102 and 104 detects the loss of 3 consecutive CCM frames, the legacy fault-handling process is activated and the impacted tunnel will be rerouted.

The above-described steps of the method 200 require the identification of the continuity check message frames belonging to a tunnel to be rerouted. As an alternative solution, the end points 102 and 104 can be notified about the link degradation by dropping all frames of the certain tunnel at a given microwave capacity level. This solution does not require the identification of continuity check message frames, but causes the loss of all data frames until the rerouting is completed. Consequently, this alternative solution is proposed, for example if the identification of continuity check message frames is problematic for some reasons. E.g., in MPLS networks, the intermediate point cannot, in some implementations, detect the continuity check messages.

Optionally, the end points 102 and 104 can check the second path 108 functioning as a backup path by using the Connectivity Fault Management standardized for Ethernet based on CCMs or any other type of continuity check messages. Consequently, a failure of the backup path 108 can be detected. However degradation is not detected, unless the technique is also applied to the backup path 108.

Figure 7:
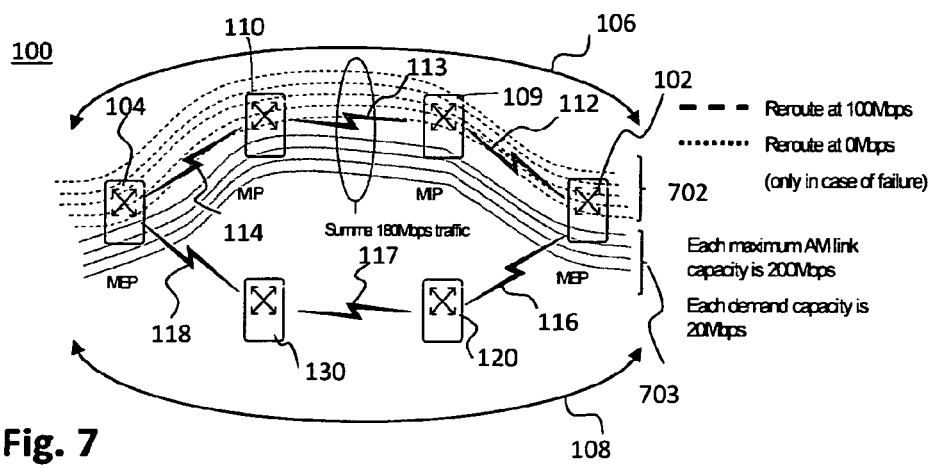
FIG. 7 schematically illustrates a normal operation of the network communicating a plurality of different communication tunnels along the first route.
Figure 8:
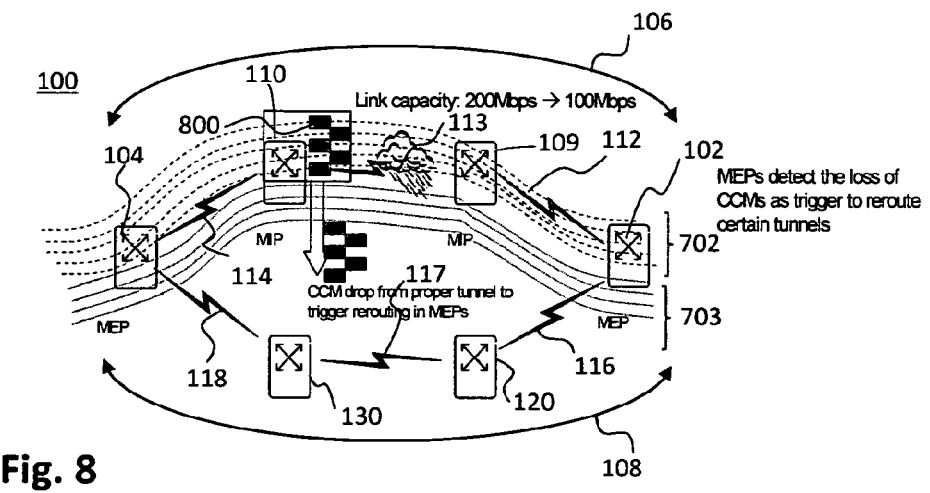
FIG. 8 schematically illustrates the dropping of certain data frames to trigger the rerouting of associated communication tunnels of the communication tunnels shown in FIG. 7.
Figure 9:
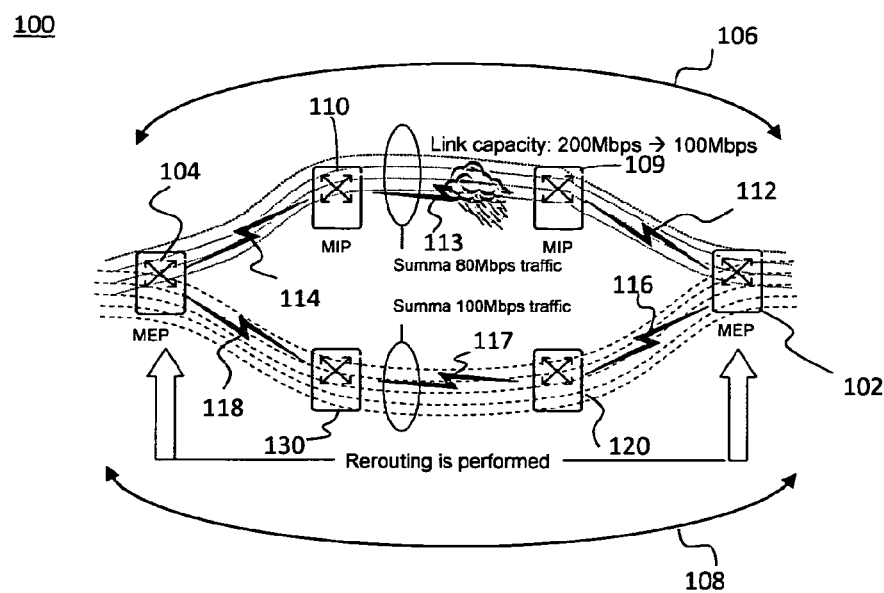
FIG. 9 schematically illustrates the network of FIGS. 7 and 8 after the rerouting of FIG. 8.

A numerical example is described with reference to the embodiment of the technique shown in FIGS. 7 to 9. The FIGS. 7 to 9 show a simplified example on how the technique is working. In the initial situation shown in FIG. 7, a first plurality of communication tunnels 702 and a second plurality of communication tunnels 703 are routed along the first route 106 of the network 100.

Each of the first route 106 and the second route 108 provides a maximum link capacity of 200 Mbit/s, which is sufficient for the total capacity of 180 Mbit/s of the tunnels 702 and 703.

A total number of 9 tunnels 702 and 703 are to be protected. Each tunnel has a capacity of 20 Mbit/s. Five of the tunnels need to be rerouted if link capacity falls to 100 Mbit/s, e.g. due to Adaptive Modulation. The other four tunnels 703 need to be rerouted in case of link failure.

Reference is made to FIG. 8. When the capacity of a link along the primary path is degraded to 100 Mbit/s, the corresponding microwave equipment starts dropping the continuity check message frames 800 carried by the impacted tunnels 702. When the end points 102 and 104 detect the loss of the continuity check message frames 800, the rerouting is performed.

After rerouting, the tunnels 702 and 703 fit to the available capacities of the paths 106 and 108. This situation with balanced capacities after the rerouting is shown in FIG. 9.

As has become apparent by means of above exemplary embodiments, at least some of the embodiments provide a mechanism to provide information about link capacity reduction, e.g., microwave link capacity degradation, to end points of a network, such as the edge nodes referred to as Maintenance End Points (MEPs). Same or some other embodiments allow explicitly dropping continuity check messages by means of intermediate points, such as the Maintenance Intermediate Points (MIPs). The explicit dropping may indicate the microwave link capacity degradation to the end points.

Currently standardized Ethernet OAM architecture and existing fault-handling mechanisms can be combined with or applied in the context of the present technique.

In at least some of the embodiments of the technique, the technique only requires implementations in the intermediate points, such as the MIPs.

The technique can be implemented in a scalable way. In some implementations, the technique is well-scalable with the number of tunnels and services, for example because the rerouting is distributed, e.g., handled independently by an impacted pair of end points.

The technique can even be implemented in the context of complex topologies and multi-edge networks. In at least some embodiments of the technique, there is no impact on the operation, if the degraded tunnels are handled by different end points as well as if the backup paths of the tunnels are different.

The technique can be implemented for a fast operation, e.g., so that rerouting can be performed within 50 ms, for example independent of the adjustment of a continuity check message transmission period.

As will be recognized by those skilled in the art, the features described herein can be modified and varied over a wide range of applications. Accordingly, the scope of patented subject-matter should not be limited to any of the specific embodiments discussed above, but is defined by the following claims.

The invention claimed is:

1. A method of routing data frames in a telecommunications backhaul network, which includes a plurality of points and links between the points providing at least two different routes for communicating data frames between a first end point and a second end point, wherein the end points are configured to route data frames belonging to a communication tunnel between the first end point and the second end point on a first route including one or more intermediate points, at least some of the data frames including a continuity check message, and to reroute data frames belonging to the communication tunnel to a second route different from the first route in response to certain data frames including the continuity check message being lost in the network, the method comprising:

switching at least one of the links of the first route to a reduced link capacity; and, in response to the switching, identifying a plurality of data frames that include the continuity check message and that are routed via the first route and dropping at least a portion of the identified data frames by at least one of the intermediate points of the first route, to trigger at least one of the first and second end points to perform a rerouting of data frames.

2. The method of claim 1, wherein data frames belonging to two or more different communication tunnels are communicated between the first end point and the second end point, each of the data frames including an identifier of the communication tunnel.

3. The method of claim 2, wherein the at least one of the intermediate points determines a lower limit of the link capacity for the corresponding one of the communication tunnels.

4. The method of claim 3, wherein at least one of the intermediate points drops all data frames belonging to the corresponding one of the communication tunnels and including the continuity check message, in response to a reduction in link capacity below the lower limit.

5. The method of claim 1, wherein the reduction in link capacity is associated with a change of a modulation applied for the link.

6. The method of claim 1, wherein the link capacity is a transmission rate currently available to the at least one intermediate point or a transmission rate currently provided by the at least one link.

7. The method of claim 1, further comprising the step of rerouting data frames belonging to the communication tunnel between the first end point and the second end point to the second route different from the first route in response to the absence of at least a portion of the data frames including the continuity check message at one or both of the end points.

8. The method of claim 7, wherein the rerouting of data frames belonging to the communication tunnel to the second route is subject to a reception of continuity check messages communicated on the second route between the first end point and the second end point.

9. The method of claim 1, wherein the routing on the first route includes at least one of transmitting from the first end point data frames including user data and transmitting from the second end point data frames including the continuity check message.

10. The method of claim 1, wherein the data frames including the continuity check message are periodically transmitted by at least one of the end points.

11. The method of claim 10, wherein the loss is determined when no continuity check message has been received at one or both of the end points for a predefined period of time.

12. A non-transitory computer-readable medium comprising, stored thereupon, a computer program product comprising program code portions for performing the steps of claim 1 when the computer program product is executed on one or more computing devices.

13. A device for routing data frames in a telecommunications backhaul network that includes a plurality of points and links between the points providing at least two different routes for communicating data frames between a first end point and a second end point, wherein the end points are configured to route data frames belonging to a communication tunnel between the first end point and the second end point on a first route including one or more intermediate points, at least some of the data frames including a continuity check message, and for rerouting data frames belonging to the communication tunnel to a second route different from the first route in response to certain data frames including the continuity check message being lost in the network, the device comprising:
a digital processing circuit configured to:
switch at least one of the links of the first route to a reduced link capacity; and,
in response to the switching, identify a plurality of data frames that include the continuity check message and that are routed via the first route and drop at least a portion of the identified data frames, to trigger at least one of the first and second end points to perform a rerouting of data frames.

14. The device of claim 13, wherein the device is located at the at least one of the intermediate points.

15. A method of routing data frames in a telecommunications backhaul network, which includes a plurality of points and links between the points providing at least two different routes for communicating data frames between a first end point and a second end point, wherein the end points are configured to route data frames belonging to a communication tunnel between the first end point and the second end point on a first route including one or more intermediate points, at least some of the data frames including a continuity check message, and to reroute data frames belonging to the communication tunnel to a second route different from the first route in response to certain data frames including the continuity check message being lost in the network, wherein data frames belonging to two or more different communication tunnels are communicated between the first end point and the second end point, each of the data frames including an identifier of the communication tunnel, the method comprising:
switching at least one of the links of the first route to a reduced link capacity;
determining, by at least one of the intermediate points, a lower limit of the link capacity for one of the communication tunnels; and
in response to the reduced link capacity being below the lower limit, dropping all data frames belonging to the corresponding one of the communication tunnels, by at least one of the intermediate points, to trigger at least one of the first and second end points to perform a rerouting of data frames.

* * * * *